Dec. 11, 1923.  1,477,106
G. CALDWELL
VEGETABLE SLICING MACHINE
Filed Oct. 4, 1922
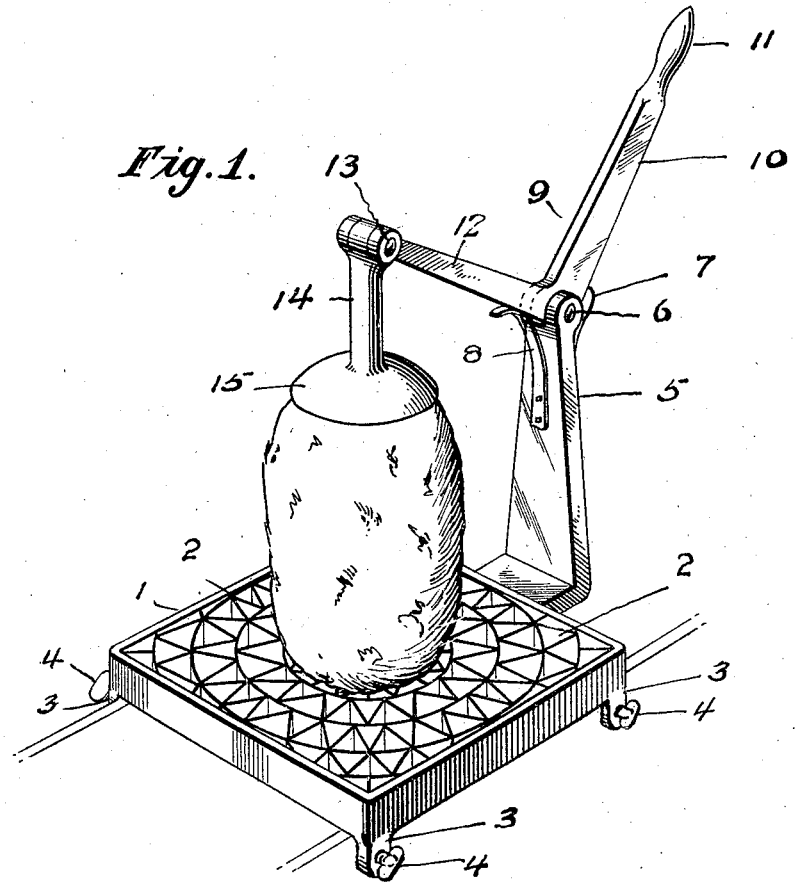
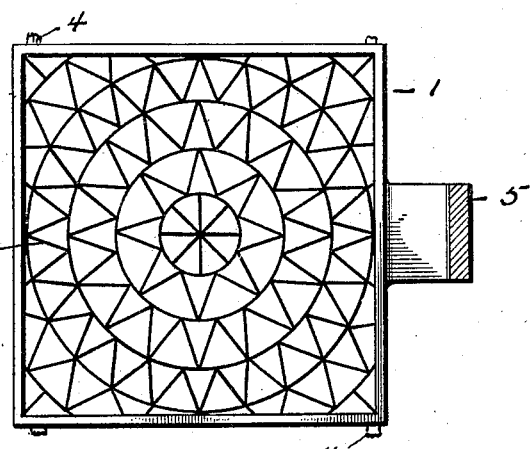
Inventor
George Caldwell,
By Wm F Doyle Attorney Patented Dec. 11, 1923.

1,477,106

UNITED STATES PATENT OFFICE.

GEORGE CALDWELL, OF WASHINGTON, DISTRICT OF COLUMBIA.

VEGETABLE-SLICING MACHINE.

Application filed October 4, 1922. Serial No. 592,389.

(FILED UNDER THE ACT OF MARCH 3, 1883, 22 STAT. L., 625.)

*To all whom it may concern:*

Be it known that I, GEORGE CALDWELL, captain, infantry, a citizen of the United States, stationed at Washington, D. C., have invented an Improvement in Vegetable-Slicing Machines, of which the following is a specification.

The invention described herein may be used by the Government, or any of its officers or employees in prosecution of work for the Government, or by any other person in the United States, without payment of any royalty thereon.

This invention relates to improvements in vegetable slicing machines, and is especially adapted for slicing potatoes into long triangular slices as ordinarily used in French frying.

The objects in view are to provide simple, durable and inexpensive means for quickly accomplishing the results desired, whereby potatoes, or other vegetables, may be uniformly sliced into triangular strips, irrespective of the size of the vegetable.

A further object being to provide a device that is readily cleaned and kept clean, and when not in use, or for transportation, may be partly separated and nested in an economical manner.

These and other objects in view will appear in the appended specification, and be finally pointed out in the claims.

Similar numerals indicate corresponding parts in all the figures of the drawings in which:

Fig. 1 is a perspective view of the improved potato slicer.

Fig. 2 is a plan view, partly in section, showing the improved cutting grill.

Reference now being had to the drawings by numerals, 1 indicates the base, which is provided in any preferred manner with a grill 2 consisting of vertical plates arranged in such a manner as to provide triangular spaces throughout, the upper edges of the grill plates being sharpened and adapted to readily pass through the vegetable being sliced.

The base is adapted to rest on a receptacle to receive the slices as they pass through the grill, and a simple form of retaining means is shown at 3, consisting of lugs projecting down from the base through which thumb screws 4 may pass to clamp the base firmly to the receptacle.

Extending out from the base frame a short distance and then in an upward direction is a supporting arm 5, provided at its upper end with a bearing 6, a stop lug 7, and on its inner surface with a leaf spring 8.

Pivotally supported on a pin in the bearing 6 is a bell crank rocker arm 9 having the operating arm 10 provided at its outer end with a handle 11, and the plunger arm 12 provided with a bearing at its outer end as shown at 13.

Pivotally mounted in the bearing 13 is a plunger stem 14, having at its lower end a plunger head 15, said plunger head preferably being of a somewhat inverted cup shape form adapted to rest on top of the potato, or other vegetable, as shown in Fig. 1.

In operating this device, the vegetable is placed as shown beneath the plunger, which is normally elevated by leaf spring 8, which holds bell crank lever in contact with stop lug 7. Handle 11 of operating arm 10 is grasped by the operator and drawn to or pushed away, said operation being determined by the position that the operator occupies in relation to the device. The plunger will be lowered with the vegetable beneath it, which will be forced down through the grill and sliced into long triangular shaped pieces, especially adapted, if a potato, for French fry. When the lever is released, spring 8 automatically returns the plunger to a position where another potato may be inserted beneath it. In some instances potatoes will be cut as above described without removing the skin, and is of especial value where food is to be prepared in large quantities very promptly.

Having thus described my invention, what I claim as new and desire to secured by Letters Patent is:

1. A base provided with a grill extending throughout its entire surface, having cutting edges, a supporting arm extending vertically from and to one side of the base and provided with a bearing and a stop at its upper end, a bell crank rocker arm pivotally mounted in the supporting arm, one of the arms of the bell crank being provided with a hand hold, and a plunger arm pivoted to the other arm adapted to force the vegetable through the grill.

2. A base provided with a grill, a supporting arm extending from the base, a bell crank rocker arm pivotally mounted in the supporting arm, a leaf spring mounted on the inner surface of the supporting arm and adapted to normally hold the plunger in an elevated position.

3. A base provided with a grill extending throughout its entire surface, having cutting edges, lugs depending from the base and clamping screws adapted to clamp the base to a receptacle, a supporting arm extending vertically from and to one side of the base provided with a bearing and a stop at its upper end, a bell crank rocker arm pivotally mounted in the supporting arm, one of the arms of said bell crank rocker arm being provided with a hand hold and the other arm being provided with a bearing, a plunger stem having a plunger head supported in the bearing of the rocker arm, and a leaf spring mounted on the inner surface of the supporting arm adapted to normally hold the plunger in an elevated position.

GEORGE CALDWELL.